United States Patent
Yoon

[11] Patent Number: 5,898,847
[45] Date of Patent: Apr. 27, 1999

[54] BUS ARBITRATION METHOD AND APPPARATUS FOR USE IN A MULTIPROCESSOR SYSTEM

[75] Inventor: Dae-Jun Yoon, Incheon, Rep. of Korea

[73] Assignee: Daewoo Telecom Ltd., Incheon, Rep. of Korea

[21] Appl. No.: 08/828,625

[22] Filed: Mar. 31, 1997

[30] Foreign Application Priority Data

Mar. 30, 1996 [KR] Rep. of Korea ..................... 96-9395

[51] Int. Cl.$^6$ .................................................. G06F 13/14
[52] U.S. Cl. ........................................... 395/293; 395/729
[58] Field of Search ................................... 395/291–305, 395/728–732

[56] References Cited

U.S. PATENT DOCUMENTS

| | | | |
|---|---|---|---|
| 4,698,746 | 10/1987 | Goldstein | 364/200 |
| 4,851,996 | 7/1989 | Boioli et al. | |
| 5,499,345 | 3/1996 | Watanabe | 395/297 |
| 5,506,971 | 4/1996 | Gullette et al. | 395/296 |
| 5,506,972 | 4/1996 | Heath et al. | 395/293 |
| 5,550,988 | 8/1996 | Sarangdhar et al. | 395/293 |

FOREIGN PATENT DOCUMENTS

| | | |
|---|---|---|
| 0476990 | 3/1992 | European Pat. Off. . |
| 2181577 | 4/1987 | United Kingdom . |

*Primary Examiner*—Ayaz R. Sheikh
*Assistant Examiner*—Jigar Pancholi
*Attorney, Agent, or Firm*—Pennie & Edmonds LLP

[57] ABSTRACT

A bus arbitration method for use in a multiprocessor system having a plurality of agents and a system bus, for determining a sampling point at which bus arbitration-related signals on the system bus are latched and arbitration-related signals on the system bus based on the latched arbitration-related signals, each of the bus arbitration-related signals representing a bus request signal asserted on the system bus by one of the agents for gaining an access to the system bus, wherein the system bus is arbitrated during an arbitration period in synchronization with a bus clock signal formed by a train of clock pulses generated at each clock period, the arbitration period being greater than N but not greater than (N+1) clock periods with N being a positive integer. At a first step, an initial sampling point is set at a predetermined point on a clock pulse. At a second step, the bus arbitration-related signals are latched at the initial sampling point to thereby select, as a subsequent sampling point, the predetermined point on an (N+1)st clock pulse generated after the clock pulse on which the initial sampling point is set, if one or more bus request signals are asserted, and the predetermined point on a next clock pulse, if no bus request signal is asserted.

18 Claims, 4 Drawing Sheets

BUS ARBITRATION METHOD AND APPPARATUS FOR USE IN A MULTIPROCESSOR SYSTEM

FIELD OF THE INVENTION

The present invention relates to a system bus arbitration method for use in a multiprocessor system having a system bus and a plurality of agents; and, more particularly, to a method for determining a sampling point at which each of the agents latches bus arbitration-related signals on the system bus.

BACKGROUND OF THE INVENTION

The use of an assembly of electrical conductors known as "bus" is common in electrical circuit designs. As shown in FIG. 1, a bus 1, which may be referred to as a system bus, is an electrical, mechanical and functional unit widely used in a multiprocessor system including a plurality of agents, such as main processor units (MPU) 2, shared memory units (SMU) 3, input/output processor units (IOU) 4 and system control units (SCU) 5, for connecting signal lines among the agents, each agent being coupled to the system bus 1.

Using a shared approach, signal lines of the system bus are used, when available, by various agents in the multiprocessor system. To avoid bus contention, which arises when two or more agents request access to a same signal line simultaneously, a bus arbiter is provided typically for determining which one of the agents will be allowed to have the access to the signal line, according to some specified access criteria. Then, the agent gaining the access to the system bus transfers address and/or data according to a predetermined transfer protocol.

Both the bus arbitration and the data transfer of all of the agents may be synchronized with a system bus clock signal. The system bus clock signal may be transmitted from a backboard to each agent through a separate signal line. In order to obtain a high data transfer rate, it may be desirable to use a high frequency bus clock, since the system performance depends on the data transfer rate, which, in turn, depends on the frequency of the system bus clock with which the bus operation, including the bus arbitration and data transfer, is synchronized.

However, the frequency of the system bus clock is restricted by the so-called bus arbitration period. The bus arbitration period, as used herein, represents a period between a time for detecting one or more bus request signals each of which is asserted by an agent requesting an access to the system bus and a time at which the winning agent assumes bus mastership. Consequently, in order to increase the bus clock frequency, it is often necessary to arbitrate the system bus for multiple periods of the bus clock in the multiprocessor system.

SUMMARY OF THE INVENTION

It is, therefore, a primary object of the present invention to provide a bus arbitration method for use in a multiprocessor system having a system bus and a plurality of agents, for determining a sampling point at which each of the agents latches bus arbitration-related signals on the system bus and arbitrating the system bus based on the latched arbitration-related signals, wherein each of the agents requires multiple periods of a bus clock for data transfer bus arbitration.

Another object of the present invention is to provide a method for use in a multiprocessor system having a system bus and a plurality of agents, for determining a sampling point at which each of the agents latches bus arbitration-related signals on the system bus, wherein each of the agents requires multiple periods of a bus clock for data transfer bus arbitration.

It is still another object of the present invention to provide a multiprocessor system having a system bus and a plurality of agents, for determining a sampling point at which each of the agents latches bus arbitration-related signals on the system bus and arbitrating the system bus based on the latched arbitration-related signals, wherein each of the agents requires multiple periods of a bus clock for data transfer bus arbitration.

In accordance with one aspect of the present invention, there is provided a bus arbitration method, for use in a multiprocessor system having a plurality of agents and a system bus, for determining a sampling point at which bus arbitration-related signals on the system bus are latched and arbitrating the system bus based on the latched arbitration-related signals, each of the bus arbitration-related signals representing a bus request signal asserted on the system bus by one of the agents for gaining an access to the system bus, wherein the system bus is arbitrated during an arbitration period in synchronization with a bus clock signal formed by a train of clock pulses generated at each clock period, the arbitration period being greater than N but not greater than (N+1) clock periods with N being a positive integer, the method comprising the steps of:

(a) setting an initial sampling point at a predetermined point on a clock pulse; and (b) latching the bus arbitration-related signals at the initial sampling point to thereby select, as a subsequent sampling point, the predetermined point on an (N+1)st clock. pulse generated after the clock pulse on which the initial sampling point is set, if one or more bus request signals are asserted, and the predetermined point on a next clock pulse, if no bus request signal is asserted.

In accordance with another aspect of the present invention, there is provided a method, for use in a multiprocessor system having a plurality of agents and a system bus, for determining a sampling point at which bus arbitration-related signals on the system bus are latched, each of the bus arbitration-related signals representing a bus request signal asserted on the system bus by one of the agents for gaining an access to the system bus, wherein the system bus is arbitrated during an arbitration period in synchronization with a bus clock signal formed by a train of clock pulses generated at each clock period, the arbitration period being greater than N but not greater than (N+1) clock periods with N being a positive integer, the method comprising the steps of:

(a) setting an initial sampling point at a predetermined point on a clock pulse; and (b) latching the bus arbitration-related signals at the initial sampling point to thereby select, as a subsequent sampling point, the predetermined point on an (N+1)st clock pulse generated after the clock pulse on which the initial sampling point is set, if one or more bus request signals are asserted, and the predetermined point on a next clock pulse, if no bus request signal is asserted.

In accordance with still another aspect of the present invention, there is provided a multiprocessor system having a system bus and a plurality of agents, each agent including an arbiter for determining a sampling point at which bus arbitration-related signals on the system bus are latched and arbitrating the system bus based on the latched arbitration-related signals, each of the bus arbitration-related signals representing a bus request signal asserted on the system bus by one of the agents for gaining an access to the system bus, wherein the system bus is arbitrated during an arbitration period in synchronization with a bus clock signal formed by a train of clock pulses generated at each clock period, the arbitration period being greater than N but not greater than (N+1) clock periods with N being a positive integer, said arbiter comprising:

means for setting an initial sampling point at a predetermined point on a clock pulse; and means for latching the bus arbitration-related signals at the initial sampling point to thereby select, as a subsequent sampling point, the predetermined point on an (N+1)st clock pulse generated after the clock pulse on which the initial sampling point is set, if one or more bus request signals are asserted, and the predetermined point on a next clock pulse, if no bus request signal is asserted.

BRIEF DESCRIPTION OF THE DRAWING

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
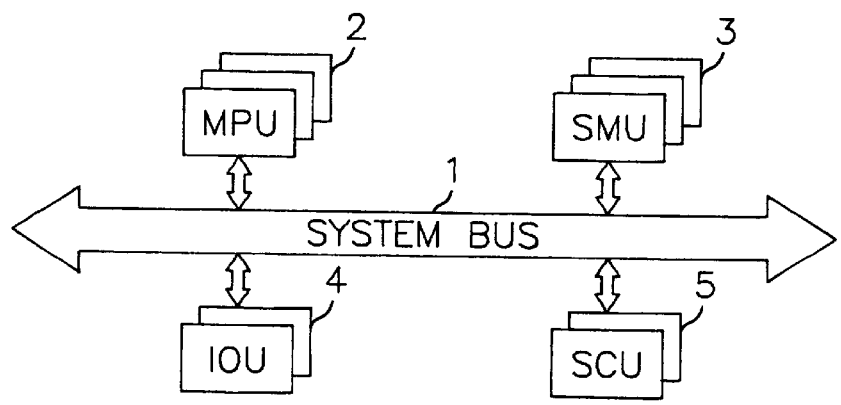
FIG. 1 represents a block diagram of a typical multiprocessor system.
Figure 2:
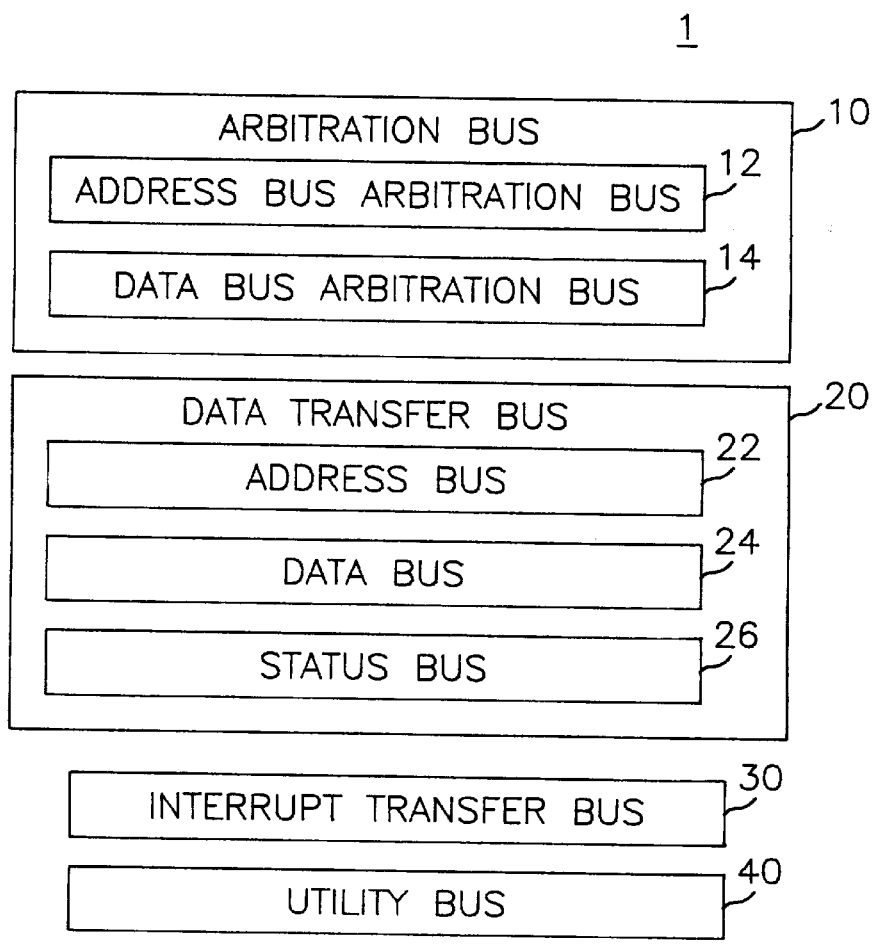
FIG. 2 shows a system bus configuration of the present invention.

Referring to FIG. 2, there is provided a system bus configuration of the present invention: a system bus 1 may comprise an arbitration bus 10, a data transfer bus 20, an interrupt transfer bus 30, and a utility bus 40: the data transfer bus 20 including an address bus 22, a data bus 24, and a status bus 26, the arbitration bus 10 including an address bus arbitration bus 12 for arbitrating the address bus 22 and a data bus arbitration bus 14 for arbitrating the data bus 24.

Since the address bus 22 and the data bus 24 are operated separately, to allow an agent to gain access to the data transfer bus 20, it is necessary to arbitrate these two buses separately. Then, the agent having access to the data transfer bus 20 transfers data according to a predetermined data transfer protocol.

Figure 3:
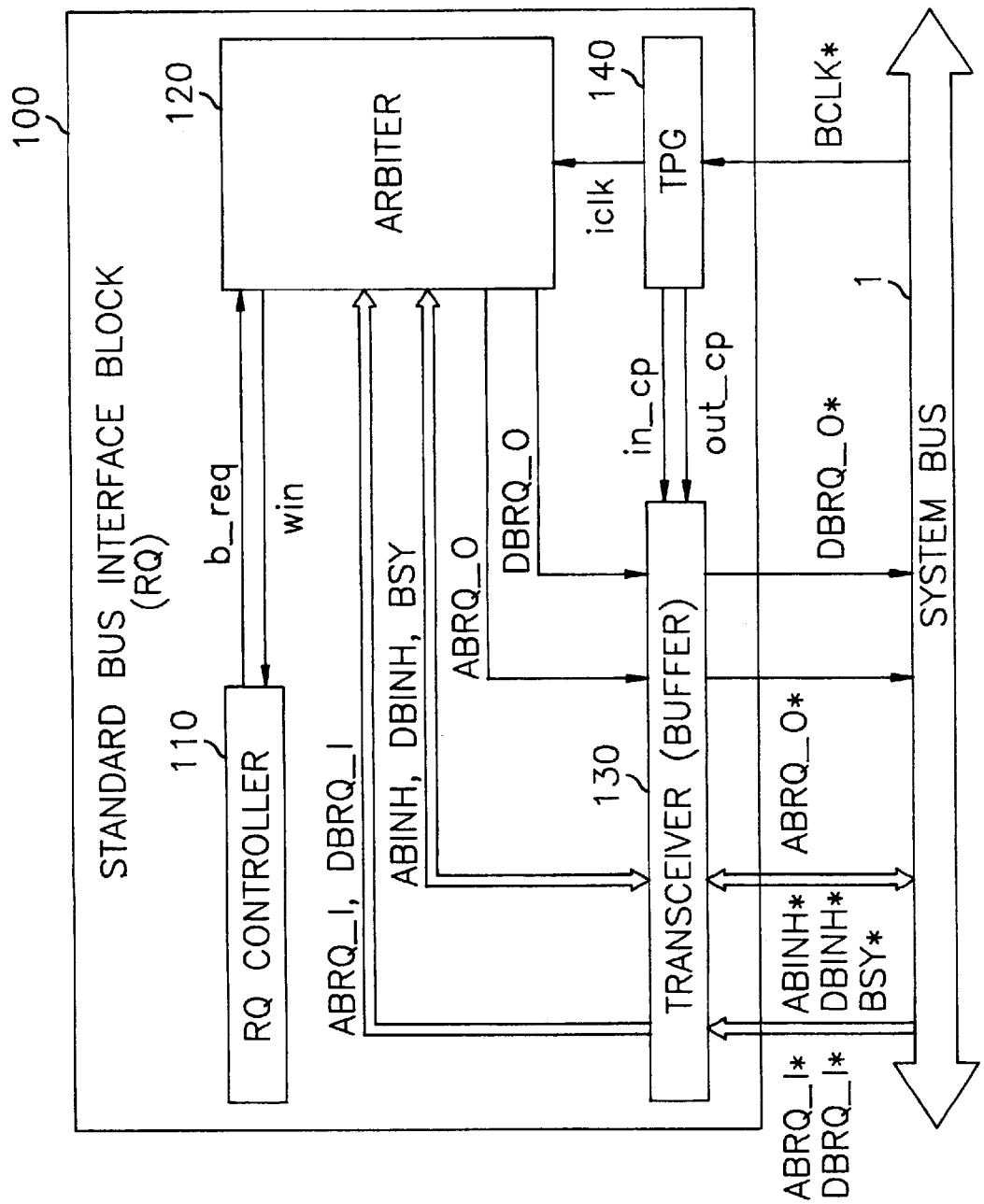
FIG. 3 offers a schematic diagram of a standard bus interface block to illustrate bus arbitration-related signals.

FIG. 3 illustrates a standard bus interface block 100 of an agent requesting data transfer (requester: RQ), which includes a RQ controller 110, an arbiter 120, a transceiver (buffer) 130, and a timing pulse generator (TPG) 140. This bus interface block 100 is shown to have a distributed arbiter configuration in that each agent has its own arbiter therein.

In FIG. 3, ABRQ_I*, ABINH*, DBRQ_I*, DBINH*, BSY*, and ABRQ_O* represent bus arbitration-related signals in the arbitration bus 20 and BCLK* is a signal in the utility bus 40. A mark * following a signal denotes that the signal is asserted at its low voltage state.

ABRQ_I*, ABINH*, and BSY* are signals for arbitrating the address bus 22. ABRQ_I* represents a plurality of address bus request input signals which are latched by the arbiter 120 of an agent via the buffer 130. ABRQ_O* is an address bus request output signal coupled to ABRQ_I<n>* on the backboard, wherein ABRQ_I<n>* is an n-th signal of ABRQ_I*. ABINH* is an address bus inhibit signal which is asserted to temporarily inhibit address bus arbitration by RQ if RQ gains the access to the address bus 22 but not for the data bus 24 during a RQ write cycle. BSY* is a busy status line signal used to temporally inhibit address bus arbitration by an agent responding to RQ (responder: RP) according to the queue status of RP.

DBRQ_I* represents a plurality of data bus request input signals which are latched by the arbiter 120 via the buffer 130. DBRQ_O* is a data bus request output signal coupled on the backboard to DBRQ_I<n>*, wherein DBRQ_I<n>* is an n-th signal of DBRQ_I*. DBINH* is a data bus inhibit signal which is asserted to inhibit data bus arbitration temporarily by RQ transferring block data for avoiding a data bus contention between a block data transfer cycle and a single data transfer cycle.

BCLK* is a bus clock signal with which the bus operation is synchronized. BCLK* is inputted to TPG 140 and then internal clock pulses (such as in_cp used when signals driven on the system bus 1 are inputted to buffer 130, out_cp used when signals in the buffer 130 are outputted to the system bus 1, and iclk for the arbiter 120 which has to be operated synchronously with BCLK*) are generated.

The arbiter 120 of RQ also receives an internal bus request signal b_req from the RQ controller 110 and transmits a win signal to the RQ controller 110.

Signals on the system bus 1 except for those signals on the utility bus 40 are latched by each agent via the buffer 130 at a predetermined sampling point and then the internal operation is performed. For example, the arbiter 120 of each agent may check whether the arbitration related signals, e.g., ABRQ_I*, on the arbitration bus 10 are asserted or not, only when it is necessary to check the signals on the arbitration bus 10 and also the signals on the arbitration bus 10 are in a valid state, instead of checking them, for example, at every rising edge of BCLK*. Thereafter, the signals on the system bus 1 are latched by each agent only at a sampling point determined pursuant to a predetermined sampling rule which will be described hereinafter.

Figure 4:
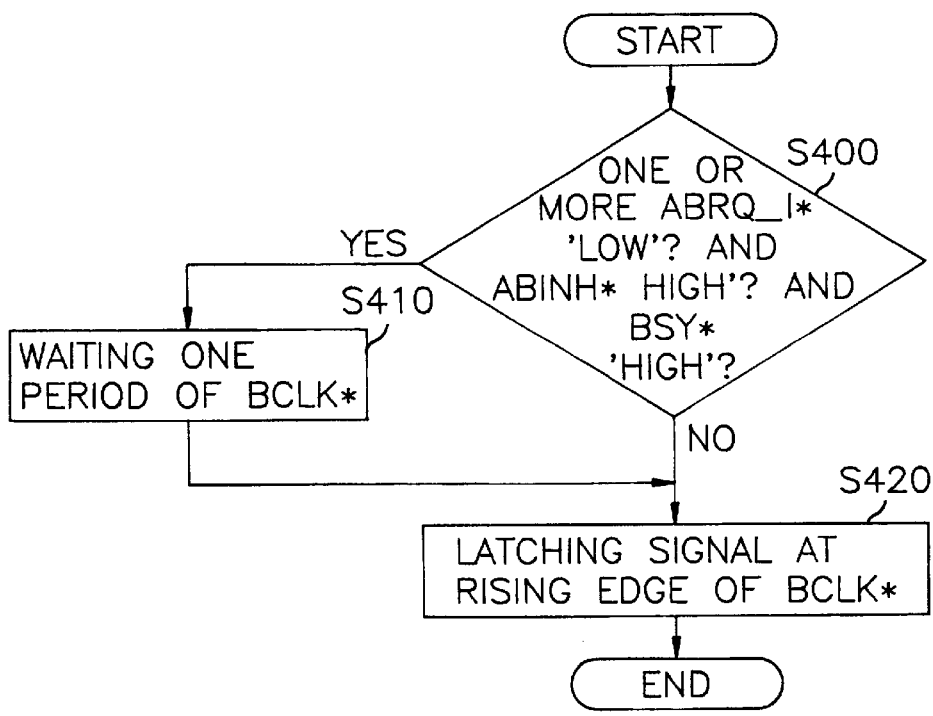
FIG. 4 presents a flow chart illustrating a sampling point determining method for address bus arbitration-related signals in accordance with the present invention.

Referring to FIG. 4, there is provided a flow chart illustrating the novel sampling point determining method for address bus arbitration-related signals in accordance with the present invention. For the sake of simplicity, the step for initial sampling point setting and the iteration process for determining subsequent sampling points are not shown. And it is assumed that more than 1 period of BCLK* is required to arbitrate the address bus 22. If one or more ABRQ_I* signals at a current sampling point are at low state, i.e. if there are one or more agents requesting access to the address bus 22, and ABINH* and BSY* signals are at high state at a step S400, then a second next rising edge of BCLK* becomes a subsequent sampling point at steps S410 and S420; and, if otherwise, then a next rising edge of BCLK* becomes the subsequent sampling point at the step S420.

Figure 5:
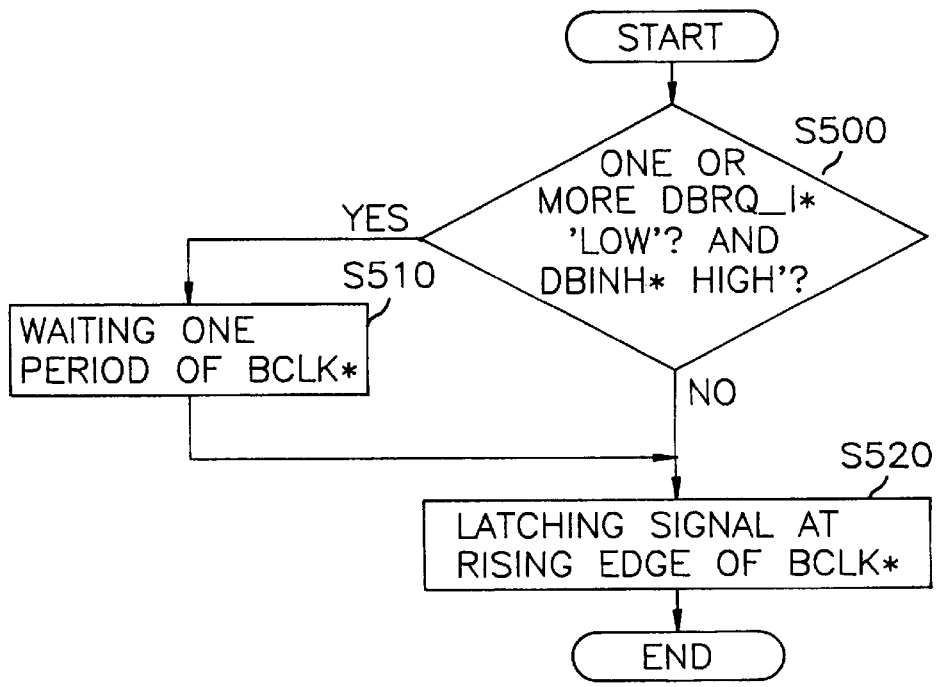
FIG. 5 describes a flow chart illustrating a sampling point determining method for data bus arbitration-related signals in accordance with the present invention.

Referring to FIG. 5, there is provided a flow chart illustrating the inventive sampling point determining method for data bus arbitration-related signals. For the sake of economy, the step for initial sampling point setting and the iteration process for determining subsequent sampling points are not shown. And it is also assumed that more than 1 period of BCLK* is required to arbitrate the data bus 24. If one or more DBRQ_I* signals latched at a current sampling point are at low state, i.e., one or more agents request access to the data bus 24 at a same time, and DBINH* signal is at high state at a step S500, then a second next rising edge of BCLK* becomes a subsequent sampling point at steps S510 and S520; and, if otherwise, a next rising edge of BCLK* becomes the subsequent sampling point at the step S520.

Figure 6:
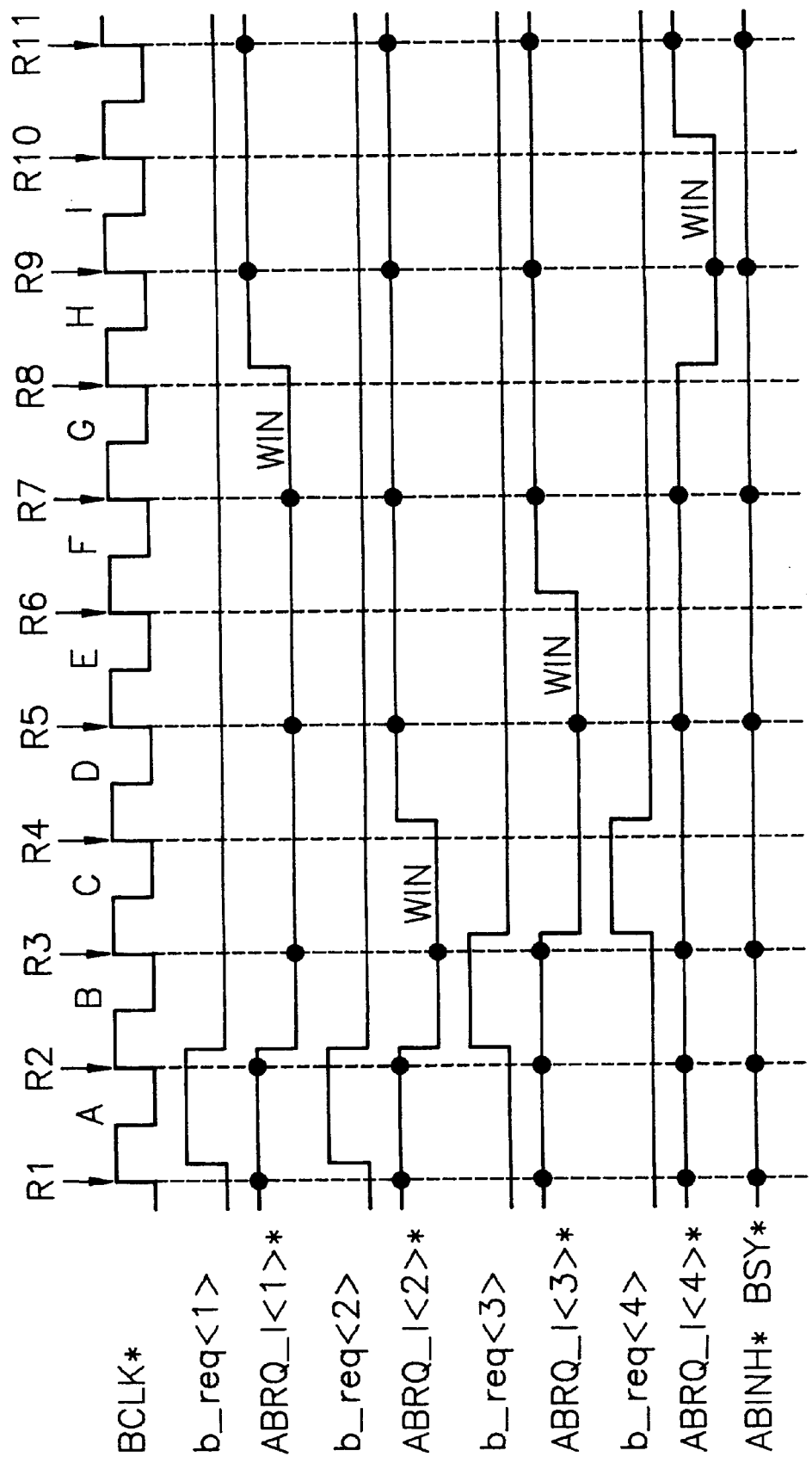
FIG. 6 provides a timing diagram for illustrating inventive address bus arbitration method.

FIG. 6 illustrates a timing diagram for arbitrating the address bus 22 using the novel sampling point determining method shown in FIG. 4. For the sake of simplicity, signals for only 4 RQ agents are shown. b_req<n>and ABRQ_I<n>* denote an internal bus request signal from the RQ controller 110 to the arbiter 120; and an address bus request input signal (address bus request output signal driven on the address arbitration bus) of the n-th agent, respectively.

Also, a fairness rule is applied in order to guarantee an equal share of the bus in FIG. 6. Under the fairness rule, each agent, coupled to the system bus 1, counts the number of asserted arbitration request input signals on the arbitration bus 10 to retrieve the arbiters 120 currently requesting access to the data transfer bus 20. When an internal bus request signal is asserted, i.e., a bus request is made from an agent, the arbiter 120 in the agent determines whether to assert ABRQ_O* of its own or not, by retrieving the signals latched at an immediately preceding sampling point. If the number of agents asserting ABRQ_O* is less than two, the agent asserts ABRQ_O*; and, if otherwise, the agent counts the number of asserted bus request signals at a next sampling point without asserting ABRQ_O* (Pseudo First Come First Serve).

And also, a win rule is applied when a plurality of agents request the data transfer bus 20. An agent asserting ABRQ_O* gains access to the address bus 22 only if there is no ABRQ_I<n>* whose priority is higher than its own, wherein a higher n represents a higher priority, and neither ABINH* nor BSY* is asserted. An agent asserting DBRQ_O* gains the access to the data bus 24 only if there is no DBRQ_I<n>* of which priority n is higher than its own and DBINH* is not asserted.

During the period A, the RQ controller 110 of the first agent asserts b_req<1>and the RQ controller 110 of the second agent asserts b_req<2>. According to the sampling point determining method of the present invention as shown in FIG. 4, a next rising edge R2 becomes a sampling point because there is no asserted ABRQ_I<n>* at the rising edge R1 of BCLK*.

During the period B, according to the fairness rule as described hereinbefore, ABRQ_I<1>(ABRQ_O* of a first agent) and ABRQ_I<2>(ABRQ_O* of a second agent) are asserted. The RQ controller 110 of the third agent asserts b_req<3>. According to the sampling point determining method, a next rising edge R3 becomes a sampling point because there is no asserted ABRQ_I<n>* at the rising edge R2 of BCLK* .

During the period C, according to the win rule, the second agent gains access to the address bus 22 and then negates ABRQ_I<2>*. The RQ controller 110 of the fourth agent asserts b_req<4>. According to the sampling point determining method, a next rising edge R4 does not a sampling point because there are two asserted ABRQ_I<1>* and ABRQ_I<2>* are those signals asserted at the rising edge R3.

During the period D, according to the fairness rule, the fourth agent does not assert ABRQ_I<4>because there are two asserted ABRQ_I* signals at the rising edge R3. According to the sampling point determining method, because a rising edge R4 is not a sampling point, the rising edge R5 becomes the sampling point.

During the period E, according to the fairness rule, the fourth agent does not assert ABRQ_I<4>because there are two asserted ABRQ_I* signals at the rising edge R4. According to the win rule, the third agent gains access to the address bus 22 and then negates ABRQ_I<3>* (Pseudo First In First Serve). According to the sampling point determining method, because there are two asserted ABRQ_I<1>* and ABRQ_I<3>signals at the rising edge R5, a next rising edge R6 will not be a sampling point and a second next rising edge R7 will become the sampling point.

During the period G, according to the win rule, the first agent gains access to the address bus and then negates ABRQ_I<1>*. According to the sampling rule, a next rising edge R8 will not be a sampling point because there is one asserted ABRQ_I<1>* signal at the rising edge R7.

During the period H, according to the fairness rule, ABRQ_I<4>* (ABRQ_O* of the fourth agent) is asserted. Because the rising edge R8 is not a sampling point, a next rising edge R9 becomes the sampling point.

During the period I, according to the win rule, the fourth agent gains access to the address bus 22 and then negates ABRQ_I<4>*. According to the sampling point determining method, because there is one asserted ABRQ_I<4>* at the rising edge R9, a next rising edge R10 will not be a sampling point and a second next rising edge R11 will become the sampling point.

While the present invention has been shown and described with respect to the particular embodiments, it will be apparent to those skilled in the art that many changes and modifications may be made without departing from the spirit and scope of the invention as defined in the appended claims.

What is claimed is:

1. A bus arbitration method, for use in a multiprocessor system having a plurality of agents and a system bus, for determining a sampling point at which bus arbitration-related signals on the system bus are latched and arbitrating the system bus based on the latched arbitration-related signals, each of the bus arbitration-related signals representing a bus request signal asserted on the system bus by one of the agents for gaining an access to the system bus, wherein the system bus is arbitrated during an arbitration period in synchronization with a bus clock signal formed by a train of clock pulses generated at each clock period, the arbitration period being greater than N but not greater than (N+1) clock. periods with N being a positive integer, the method comprising the steps of:

(a) setting an initial sampling point at a predetermined point on a clock pulse; and
    (b) latching the bus arbitration-related signals at the initial sampling point to thereby select, as a subsequent sampling point, the predetermined point on an (N+1)st clock pulse generated after the clock pulse on which the initial sampling point is set, if one or more bus request signals are asserted, and the predetermined point on a next clock pulse, if no bus request signal is asserted.

2. The bus arbitration method of claim 1, wherein said bus arbitration-related signal represents one of the bus request signal asserted on the system bus by an agent for gaining an access to the system bus, a bus inhibition signal asserted on the system bus for inhibiting bus arbitration by an agent requesting data transfer and a busy signal asserted on the system bus for inhibiting bus arbitration by an agent responding to other agent requesting data transfer.

3. The bus arbitration method of claim 2, wherein, in said step (b), said predetermined point on the (N+1)st clock pulse is determined as the subsequent sampling point if and only if one or more bus request signals and none of the bus inhibition and the busy signals are asserted, and, if otherwise, the predetermined point on the next clock pulse is determined as the subsequent sampling point.

4. The bus arbitration method of claim 3, wherein said predetermined point is a rising edge of a clock pulse.

5. The bus arbitration method of claim 3, wherein each agent includes means for determining the sample point, said means being arranged to delay the sample point upon detection of a predetermined condition.

6. The bus arbitration method of claim 3, wherein said system bus includes a data transfer bus having an address bus and a data bus and an arbitration bus having an address bus arbitration bus and data bus arbitration bus.

7. The bus arbitration method of claim 6, wherein said bus request signal is an address bus request signal on the address bus arbitration bus.

8. The bus arbitration method of claim 6, wherein said bus request signal is a data bus request signal on the data bus arbitration bus.

9. The bus arbitration method of claim 7, further comprising, after said step (b), the step of (c) repeating said step (b) with respect to the subsequent sampling point to determine further sampling points.

10. The bus arbitration method of claim 8, further comprising, after said step (b), the step of (c) repeating said step (b) with respect to the subsequent sampling point to determine further sampling points.

11. A method, for use in a multiprocessor system having a plurality of agents and a system bus, for determining a sampling point at which bus arbitration-related signals on the system bus are latched, each of the bus arbitration-related signals representing a bus request signal asserted on the system bus by one of the agents for gaining an access to the system bus, wherein the system bus is arbitrated during an arbitration period in synchronization with a bus clock signal formed by a train of clock pulses generated at each clock period, the arbitration period being greater than N but not greater than (N+1) clock periods with N being a positive integer, the method comprising the steps of:

(a) setting an initial sampling point at a predetermined point on a clock pulse; and (b) latching the bus arbitration-related signals at the initial sampling point to thereby select, as a subsequent sampling point, the predetermined point on an (N+1)st clock pulse generated after the clock pulse on which the initial sampling point is set, if one or more bus request signals are asserted, and the predetermined point on a next clock pulse, if no bus request signal is asserted.

12. The method of claim 11, wherein said bus arbitration-related signal represents one of the bus request signal asserted on the system bus by an agent for gaining an access to the system bus, a bus inhibition signal asserted on the system bus for inhibiting bus arbitration by an agent requesting data transfer and a busy signal asserted on the system bus for inhibiting bus arbitration by an agent responding to other agent requesting data transfer.

13. The method of claim 12, wherein, in said step (b), said predetermined point on the (N+1)st clock pulse is determined as the subsequent sampling point if and only if one or more bus request signals and none of the bus inhibition and the busy signals are asserted, and, if otherwise, the predetermined point on the next clock pulse is determined as the subsequent sampling point.

14. The method of claim 13, wherein each agent includes means for determining the sample point, said means being arranged to delay the sample point upon detection of a predetermined condition.

15. The method of claim 14, further comprising, after said step (b), the step of (c) repeating said step (b) with respect to the subsequent sampling point to determine further sampling points.

16. A multiprocessor system having a system bus and a plurality of agents, each agent including an arbiter for determining a sampling point at which bus arbitration-related signals on the system bus are latched and arbitrating the system bus based on the latched arbitration-related signals, each of the bus arbitration-related signals representing a bus request signal asserted on the system bus by one of the agents for gaining an access to the system bus, wherein the system bus is arbitrated during an arbitration period in synchronization with a bus clock signal formed by a train of clock pulses generated at each clock period, the arbitration period being greater than N but not greater than (N+1) clock periods with N being a positive integer, said arbiter comprising:

means for setting an initial sampling point at a predetermined point on a clock pulse; and means for latching the bus arbitration-related signals at the initial sampling point to thereby select, as a subsequent sampling point, the predetermined point on an (N+1)st clock pulse generated after the clock pulse on which the initial sampling point is set, if one or more bus request signals are asserted, and the predetermined point on a next clock pulse, if no bus request signal is asserted.

17. The multiprocessor system of claim 16, wherein said bus arbitration-related signal represents one of the bus request signal asserted on the system bus by an agent for gaining an access to the system bus, a bus inhibition signal asserted on the system bus for inhibiting bus arbitration by an agent requesting data transfer and a busy signal asserted on the system bus for inhibiting bus arbitration by an agent responding to other agent requesting data transfer.

18. The multiprocessor system of claim 17, wherein said predetermined point on the (N+1)st clock pulse is determined as the subsequent sampling point if and only if one or more bus request signals and none of the bus inhibition and the busy signals are asserted, and, if otherwise, the predetermined point on the next clock pulse is determined as the subsequent sampling point.

* * * * *